Jan. 24, 1961 G. B. BENANDER 2,969,418

INTERCHANGEABLE WIRING DEVICES

Filed March 3, 1958

Inventor:
George B. Benander,
by Richard L. Caslin
His Attorney 2,969,418
Patented Jan. 24, 1961

2,969,418

INTERCHANGEABLE WIRING DEVICES

George B. Benander, Oaklawn, R.I., assignor to General Electric Company, a corporation of New York Filed Mar. 3, 1958, Ser. No. 718,772

1 Claim. (Cl. 174—53)

The present invention relates to electric wiring devices and particularly to an interchangeable line of such devices that are fastened on a single mounting bracket in groups oi three for inclusion in a single gang box. An interchangeable line of wiring devices includes toggle switches, convenience outlets, and pilot lights. They are all made of minimum size to conserve space within the single gang box for the accumulation of the excess wire ends.

The biggest advantage of interchangeable devices is that they may be sold as individual devices separate from the mounting bracket. The electrical contractor, electrician or homeowner has an opportunity to select a wide variety of combinations of devices to suit the particular circuit arrangement that is preferred. One example of a much-used combination would be a three-way toggle switch, pilot light and a single pole switch. Such an arrangement would be found near the outside kitchen door; first, for controlling a light on the breezeway. The pilot light would be energized when the light is turned on. This provides an indicator means to remind the occupant of the house that the outside light is on. The single pole switch would be used to control the ceiling light in the kitchen. Interchangeable wiring devices have been known and used for many years. This invention is concerned with a new and improved method of attaching the wiring devices to the mounting bracket.

Accordingly, the primary object of the present invention is to provide an interchangeable wiring device with bendable hook members which may be adjusted until the wiring device is firmly anchored in the mounting bracket.

A further object of this invention is to provide interchangeable wiring devices with novel mounting means for cooperation in a supporting bracket, so that standard brackets may be used and the devices may be replaced without damage to the bracket or the devices.

The preferred embodiment of the present invention has a hollow housing of insulating material comprising a recessed base and a cover member. The cover is held in place by a metal strap that overlies the cover and is fastened at its opposite ends to the base. The cover has a raised rectangular portion that extends through a close-fitting opening in the strap. Two of the opposite sides of the opening are each provided with a pair of inverted L-shaped hook members which extend perpendicularly to the strap. Each L-shaped hook has one vertical leg joined with the strap and a horizontal leg directed toward the complementary leg of the other hook. This wiring device is adapted to be assembled in a mounting bracket having one, and in some cases, three apertures that each closely approximate in size the opening in the strap of the wiring device. Accordingly, the device is inserted from the back of the bracket through the aperture and once it is in place, a screwdriver or similar tool is used to twist each pair of hook members in such a way that the vertical leg portion of each hook is twisted to press firmly against the side edge of the aperture in the mounting bracket. At the same time, the horizontal leg of the same hook member is tilted until it likewise bends the leg portion of the hook over the edge of the bracket. This same twisting and bending action is present in the other three hook members so that they cooperate in unison to firmly hold the device to the bracket and prevent any looseness or relative movement between the device and bracket.

My invention will be better understood from the following description taken in connection with the accompanying drawing and its scope will be pointed out in the appended claim.

Figure 1:
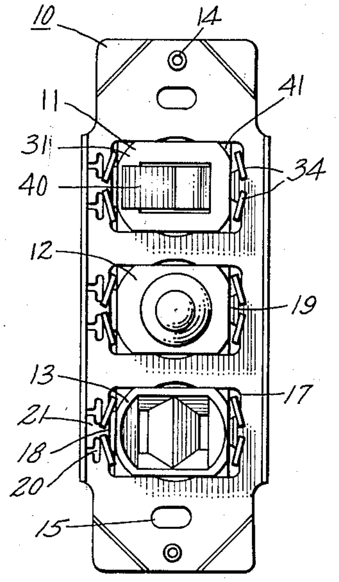
Figure 1 is a front view of a single mounting bracket containing three interchangeable wiring devices assembled therein.
Figure 2:
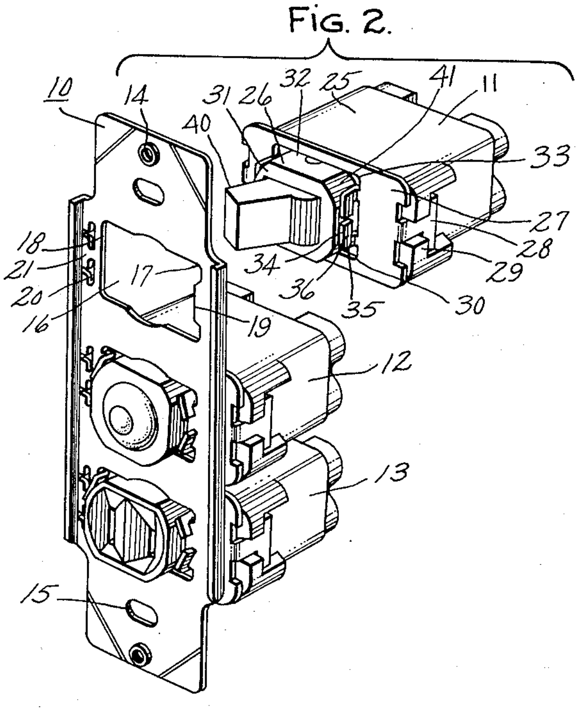
Figure 2 is an isometric view of the assembly of Figure 1 showing the toggle switch separately from the bracket and the normal disposition of the L-shaped hook members on the strap of the switch.
Figure 3:
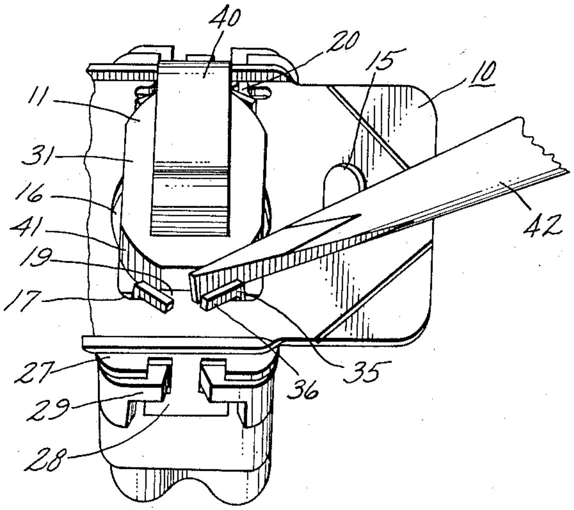
Figure 3 is an enlarged view showing the toggle switch fastened to the bracket and a portion of the blade of a screwdriver that is being used to twist the hook members into locking position.

Referring in detail to the drawing and in particular to the isometric view of Figure 2, 10 represents a standard mounting bracket for interchangeable wiring devices as is taught by the expired Despard Patent No. 1,992,059. Three types of interchangeable wiring devices are shown with this bracket, namely, a toggle switch 11, pilot light 12, and a single convenience outlet 13. The mounting bracket is of elongated rectangular shape that is stamped from thin sheet steel. A tapped opening 14 is located at each end of the bracket for receiving fastening screws (not shown) that hold a face-plate over the bracket assembly and cover the single gang box in which the assembly is located. Adjacent these tapped openings 14 are elongated slots 15 through which additional fastening screws (not shown) are inserted for attaching the bracket to suitable lugs of the single gang box. The main portion of the bracket is provided with three generally rectangular apertures 16, each having a similar configuration. Each aperture 16 extends lengthwise across the bracket 10 so that the wiring devices 11, 12 and 13 or any other combinations thereof may be stacked in a vertical fashion in the bracket.

Attention is now directed to the opposite sides of aperture 16 as shown in Figure 2. One side is designated 17 while the other is identified as 18. Side 17 has an inwardly directed projection 19 that is adapted to slip into a receiving portion of the wiring device. The opposite side 18 of the aperture is designed so that it may be bent or deformed inwardly to establish an adjustable projection similar to projection 19. Side 18 may be bent inwardly of the aperture because it is weakened by a pair of T-shaped slots 20. Each slot may receive the blade of a screwdriver which is then turned in a manner to force the edge 18 inwardly. Between the two T-shaped slots 20 is naturally formed a T-shaped tab 21. The purpose of the tab 21 is to provide a means for withdrawing the side 18 from the wiring device and returning it to its original shape shown in Figure 2. The nature of this bendable side 18 of the aperture for receiving the wiring device is standard construction in this art and does not represent a part of the invention claimed herein. For purposes of the present invention, side 18 could be rigid by eliminating the T-shaped slots 20. A standard mounting bracket 10 has been shown merely for purposes of illustration to indicate that the wiring devices of the present invention may be mounted on the standard bracket which is so familiar to those skilled in this art.

Turning now to a consideration of the wiring devices and particularly toggle switch 11, it has a hollow housing comprising a recessed base 25 and a cover member 26 that fits into the top of the base. A metal strap 27 fits over the cover 26 and is fastened at its ends by means of tabs 28 that are bent to engage under the handing projections 29 as is well understood in this art. A rectangularly shaped opening 30 is formed in the strap 27 to receive a raised portion 31 of the cover that is closely fitted therein. The cover of each wiring device 11, 12 and 13 has a raised portion similar to portion 31 of the switch 11 to extend through a suitable opening in the faceplate (not shown) and forwardly thereof. The rectangular opening 30 has opposed long sides 32 and short sides 33. On each short side 33, a pair of inverted L-shaped hook members 34 are formed as inward projections. Each hook member has one leg 35 connected to the side edge 33 and another leg 36 directed toward the complementary leg of the other hook. Both hook members are bent to lie in a plane at a right angle to the plane of the strap 27, as is best shown on the toggle switch 11 of Figure 2.

The method of assembling such devices in the mounting strap 10 is quite simple and is the same for all of the devices 11, 12 and 13. Accordingly, only the toggle switch 11 will be described in detail. The switch 11 would be brought to the back of the bracket 10 and the switch trigger 40 would be inserted through the aperture 16. First, the double hooks 34, nearest the inner projection 19 of the aperture, would be engaged over the projection. This will permit the opposite pair of hook members to extend through the aperture 16. Then the hook members 34 are twisted outwardly toward the sides of the mounting bracket to overlie the front face thereof. Attention is directed to the fact that the raised portion 31 of the cover has beveled edges 41 at the four corners thereof to facilitate the insertion of the blade 42 of a screwdriver between the raised portion 31 and the legs 36 of the hook members. It will be recognized that as a turning force is applied to the free end of the horizontal leg 36 of each hook member, the supporting leg 35 will be twisted spirally. This is a definite advantage because the twisted legs 35 bring forces to bear on the opposite side edges 17 and 18 of the aperture 16. This takes up any slack between the hook members and the mounting bracket and prevents any looseness or relative movement between the device and the bracket. Also, it should be recognized that the supporting legs 35 of the hook members are not only twisted spirally by the turning movement of the leg 36, but they are also bent outwardly to overlie the front face of the mounting bracket.

This design has proved to be a decided improvement over previous designs available on the market. Mention is made of the fact that the bendable side 18 of the apertures 16 in the mounting bracket, has not been deformed and that for purposes of the present invention, it could be made without the T-shaped slots 20. Wiring devices made according to the invention claimed herein have been placed on the market and they are enjoying widespread acceptance in both the construction and consumer markets. There are two important advantages in this design which are not available in the known prior art. First, the double hook locking members provide an adjustment that is completely reliable and firm to eliminate any looseness or relative movement between the elements. This rigidity is not possible, to the same extent, when bendable or pivoted locking members are formed on the mounting bracket to engage in loops or mating recesses in the devices. Secondly, it is possible to change or replace the devices by merely pressing the vertical legs 36 of the hook members back into the position shown on the toggle switch of Figure 2. This is a simple operation which can be performed with ease. The same is not true where an edge of the aperture in the mounting bracket is distorted to hold the device in place. Oftentimes with such bendable side edges, it is necessary to distort the edge of the aperture permanently in order to remove a device. Then the bracket must be replaced with a new one in order to complete the installation.

Having described above my invention of a novel mounting means for holding interchangeable wiring devices in a standard mounting bracket, it will be readily understood by those skilled in this art that I have simplified the installation of such devices. Also, I have provided a reliable means for replacing the devices, once they are installed, without damage to the devices or to the mounting bracket. Moreover, I have made it possible to eliminate relative movement between the devices and the mounting bracket. Once the assembly is installed in a single gang box and the faceplate is attached, it is not possible to slide or twist the devices when throwing the switch trigger or inserting or withdrawing attachment plugs from the convenience outlet. Such sliding movement is undesirable because of the tendency to loosen the connection of the lead wires that are joined with the devices.

Modifications of this invention will occur to those skilled in this art and it is to be understood, therefore, that this invention is not limited to the particular embodiments disclosed but that it is intended to cover all modifications which are within the true spirit and scope of this invention.

What I claim as new and desire to secure by Letters Patent of the United States is:

The combination of one or more interchangeable wiring devices assembled in a mounting bracket, each wiring device comprising a hollow housing of insulating material having a recessed base and cover member, said cover member having a central opening through which a portion of the base extends, and strap means fastened to the base and overlying the cover to complete the assembly of the device, said strap having a central opening with at least one pair of parallel sides, each parallel side of the cover adjacent the opening supporting a pair of inverted L-shaped hook members which extend perpendicularly to the cover in a single plane, each hook having one vertical leg joined with the cover and a horizontal leg directed toward the complementary leg of the other hook, the said mounting bracket having an aperture for each device, said aperture closely approximating the size of the opening in the cover of the device, and an inner projection from one edge of the aperture in the mounting bracket, the said projection extending between the vertical legs of the related pair of L-shaped hook members, each device being fastened in the aperture of the bracket by twisting the pair of hook members opposite the projection into overlying engagement with the front face of the bracket.

References Cited in the file of this patent

UNITED STATES PATENTS

| | | |
|---|---|---|
| 2,201,743 | Peterson | May 21, 1940 |
| 2,248,201 | Russell et al. | July 8, 1941 |
| 2,506,212 | Grohsgal | May 2, 1950 |
| 2,579,841 | Ludwig | Dec. 25, 1951 |
| 2,616,643 | Budd | Nov. 4, 1952 |
| 2,854,501 | Ludwig | Sept. 30, 1958 |